(12) United States Patent
Anderson et al.

(10) Patent No.: US 7,646,384 B2
(45) Date of Patent: Jan. 12, 2010

(54) SYSTEM AND METHOD TO DETERMINE A SIMPLIFIED REPRESENTATION OF A MODEL

(75) Inventors: Timothy Anderson, Huntsville, AL (US); Ronald Conerly, Huntsville, AL (US); Aditya Gurushankar, Huntsville, AL (US); Daniel C. Staples, Huntsville, AL (US); Mallikarjuna Gandikota, Huntsville, AL (US); Prasad Pingali, Huntsville, AL (US)

(73) Assignee: Siemens Product Lifecycle Management Software Inc., Plano ( * ) Notice: Subject to any disclaimer, the term of this patent is extended or adjusted under 35 U.S.C. 154(b) by 63 days.

(21) Appl. No.: 11/278,110

(22) Filed: Mar. 30, 2006

(65) Prior Publication Data

US 2006/0250388 A1 Nov. 9, 2006

Related U.S. Application Data

(60) Provisional application No. 60/666,973, filed on Mar. 31, 2005.

(51) Int. Cl.
*G06T 15/00* (2006.01)

(52) U.S. Cl. .................... 345/420; 345/422; 345/426; 345/428

(58) Field of Classification Search .............. 345/419, 345/420, 421, 422, 426, 428
See application file for complete search history.

(56) References Cited

U.S. PATENT DOCUMENTS

| 5,574,835 A | * | 11/1996 | Duluk et al. ............. 345/421 |
| 6,897,863 B2 | * | 5/2005 | Kindratenko et al. ....... 345/421 |
| 2003/0103048 A1 | | 6/2003 | Kindratenko et al. ....... 345/421 |

FOREIGN PATENT DOCUMENTS

EP 0 549 944 A2 7/1993

OTHER PUBLICATIONS

Zhang, E et al, Institute of Electrical and Electronics Engineers: "Visibility-guided simplifcation", VIS 2002. IEE Visualization 2002.

* cited by examiner

*Primary Examiner*—Phu K Nguyen
(74) *Attorney, Agent, or Firm*—Michael J. Wallace

(57) ABSTRACT

A system, method, and computer program for determining a simplified representation of an assembly model comprising the steps of saving a plurality of display states and configuration settings of an assembly model in a design representation; translating said design representation into a simplified representation by use of a visibility solution; and storing said simplified representation and said design representation in an assembly document and appropriate means and computer-readable instructions.

18 Claims, 9 Drawing Sheets

SYSTEM AND METHOD TO DETERMINE A SIMPLIFIED REPRESENTATION OF A MODEL

PRIORITY OF APPLICATION

The present application claims priority of U.S. Provisional Application Ser. No. 60/666,973 filed Mar. 31, 2005, which is incorporated herein by reference.

TECHNICAL FIELD

This invention relates generally to computer graphics. More specifically, the invention relates to a system and method of determining a simplified representation of a CAD assembly.

BACKGROUND

The computer has greatly affected essentially all forms of information management, including computer aided design and drafting (CAD) tools. Some simpler geometric modeling computer program products can only model in two dimensions at a time, while more complex and powerful computer program products provide three dimensional editing and visualization capabilities.

Three dimensional geometric modeling programs can generate a complex high-level assembly that can comprise one or more constituent 3D solid shapes. For example, a table assembly could comprise a solid shape for each leg of the table, where each leg is an identical design placed relative to each other, as well as a solid shape for a flat table top. Today, however, CAD representations are becoming more and more complex; typically combining numerous intricate 3D drawings to create a final product like an airplane, a car or even a factory. Each level of abstraction requires various degree of granularity, particularly when it comes to comparing manufacturing versus bill of material information versus conceptual design. Likewise, when rendering a 3D model in its entirety, a computer requires considerable resources from its central processing unit (CPU) and/or random access memory (RAM), for example. In the industry, it is common to spend hours to days of computing time to render a highly complex structure.

The increased rendering time places a burden on computer systems and organizations that desire rapid progression from design to development. Therefore, when designing the 3D model of the high-level structure, manufacturing entities have a need to reduce rendering times of each of the individual sub-assemblies that comprise the higher-level assembly while maintaining the design integrity of the entire design concept.

Furthermore, users of CAD systems require various levels of product structure where at one end there is a need for detailed design information, and at the other end, a simplified representation is needed. That being said, those users have to easily switch between simplified and design representations throughout the product design process, while maintaining constant product definition. Those same users want to balance the ability to freely deliver to third parties a simplified representation of 3D models that does not divulge potential intellectual property with sufficient detail to communicate the product design.

There is a need for a solution that can efficiently and effectively simplify the 3D representation of a designed product particularly at various levels of design when various needs for detailed information is required. There is also a need for a solution that can provide the ability for a user to deliver some level of product detail to prospective customers and clients without unintentionally divulging proprietary information.

SUMMARY

To achieve the foregoing, and in accordance with the purpose of the presently preferred embodiment as broadly described herein, the present application provides a method to determine a simplified representation of an assembly model comprising the steps of saving a plurality of display states and configuration settings of an assembly model in a design representation; translating said design representation into a simplified representation by use of a visibility solution; and storing said simplified representation and said design representation in an assembly document. The method, wherein the integrity of the association of at least said simplified representation and said design representation is maintained. The method, wherein said step of translating said design representation into said simplified representation by use of said visibility solution, further comprises the steps of rendering a model having a plurality of parts with at least one color value encoded for an at least one corresponding surface identity; distinguishing a plurality of exterior parts from a plurality of interior parts based on said at least one corresponding surface identity; and identifying a plurality of features in said model not copied into a composite image. The method, further comprising the step of displaying said plurality of parts from at least one orientation. The method, further comprising the step of displaying said composite image comprised of said exterior parts and lacking said plurality of features. The method, further comprising the step of preparing said model to improve accuracy of a rendering operation. The method, further comprising the step of implementing at least one filtering algorithm to adjust a quality of analysis of said rendering. The method, further comprising the step of preparing said model to adjust accuracy of a rendering operation wherein said accuracy is adjusted by tessellating said model. The method, wherein said step of rendering operates to depict said model as a tessellated version of a geometrical representation of a plurality of surfaces.

An advantage of the presently preferred embodiment is to provide a computer-program product tangibly embodied in a machine readable medium to perform a method to determine a simplified representation of an assembly model, comprising instructions for saving a plurality of display states and configuration settings of an assembly model in a design representation; instructions for translating said design representation into a simplified representation by use of a visibility solution; and instructions for storing said simplified representation and said design representation in an assembly document. The computer-program product, wherein the integrity of the association of at least said simplified representation and said design representation is maintained. The computer-program, wherein said instructions for translating said design representation into said simplified representation by use of said visibility solution, further comprises instructions for rendering a model having a plurality of parts with at least one color value encoded for an at least one corresponding surface identity; instructions for distinguishing a plurality of exterior parts from a plurality of interior parts based on said at least one corresponding surface identity; and instructions for identifying a plurality of features in said model not copied into a composite image. The computer-program product, further comprising the instructions for displaying said plurality of parts from at least one orientation. The computer-program product, further comprising the instructions for displaying said composite image comprised of said exterior parts and lacking said plurality of features. The computer-program product, further comprising the instructions for preparing said model to improve accuracy of a rendering operation. The computer-program product, further comprising the instructions for implementing at least one filtering algorithm to adjust a quality of analysis of said rendering. The computer-program product, further comprising the instructions for preparing said model to adjust accuracy of a rendering operation wherein said accuracy is adjusted by tessellating said model. The computer-program product, wherein said instructions for rendering operates to depict said model as a tessellated version of a geometrical representation of a plurality of surfaces.

Another advantage of the presently preferred embodiment is to provide a data processing system having at least a processor and accessible memory to implement a method to determine a simplified representation of an assembly model, comprising means for rendering a model having a plurality of parts with at least one color value encoded for an at least one corresponding surface identity; means for distinguishing a plurality of exterior parts from a plurality of interior parts based on said at least one corresponding surface identity; and means for identifying a plurality of features in said model not copied into a composite image.

Still another advantage of the presently preferred embodiment is to provide a simplified representation of an assembly model embodied on a computer-readable medium on a computer in conjunction with an application, the simplified representation comprising a reduced form of an assembly model derived from a designed form of said assembly model, having a plurality of exterior faces, wherein said exterior faces consist of a plurality of components from said design form; and said reduced form is associatively coupled with said designed form, accessible from a common assembly document.

Other advantages of the presently preferred embodiment will be set forth in part in the description and in the drawings that follow, and, in part will be learned by practice of the invention.

The presently preferred embodiment will now be described with reference made to the following Figures that form a part hereof. It is understood that other embodiments may be utilized and changes may be made without departing from the scope of the present invention.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 1:
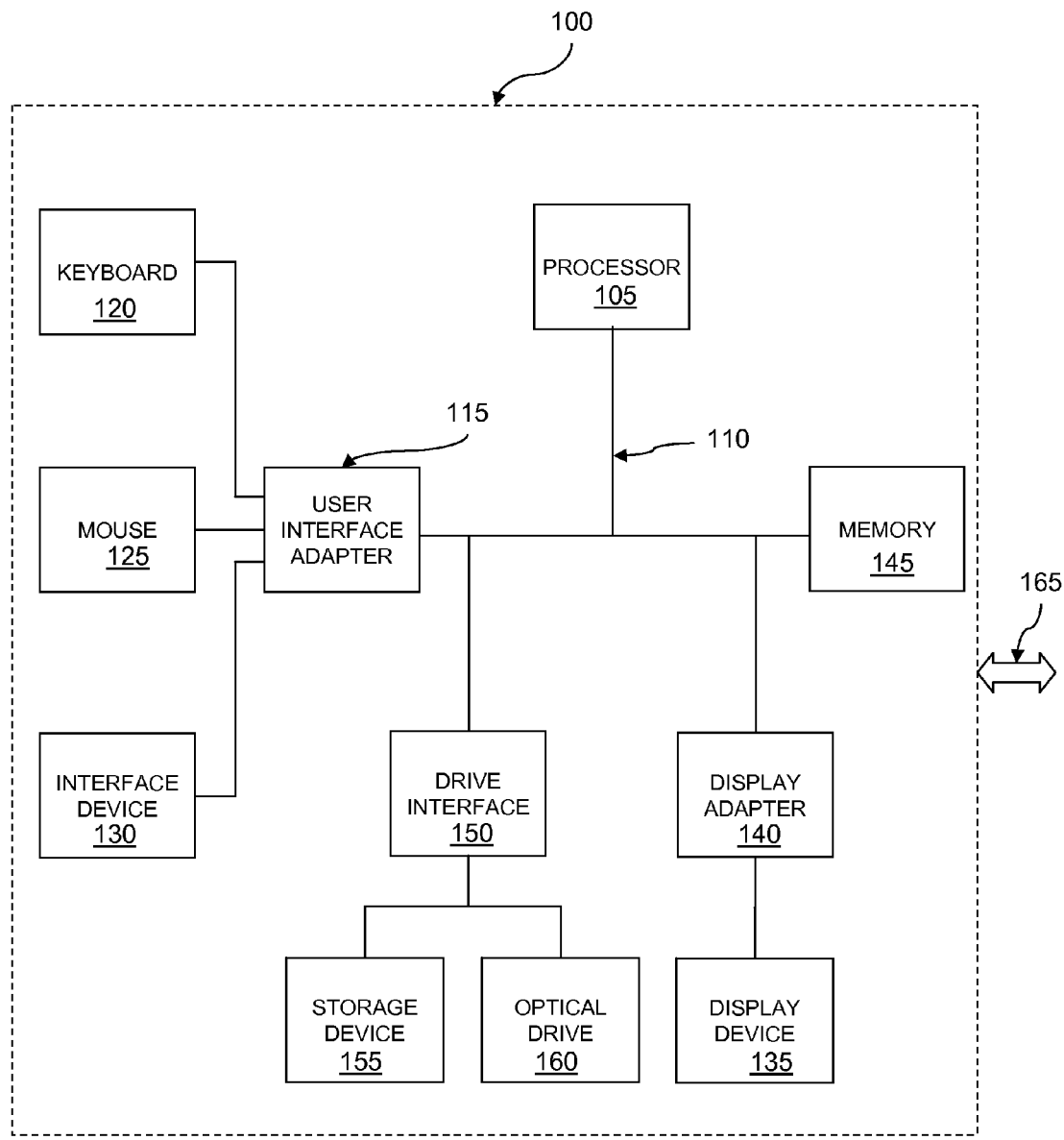
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of determining a simplified representation of a CAD assembly. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types and the presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers.

The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 2:
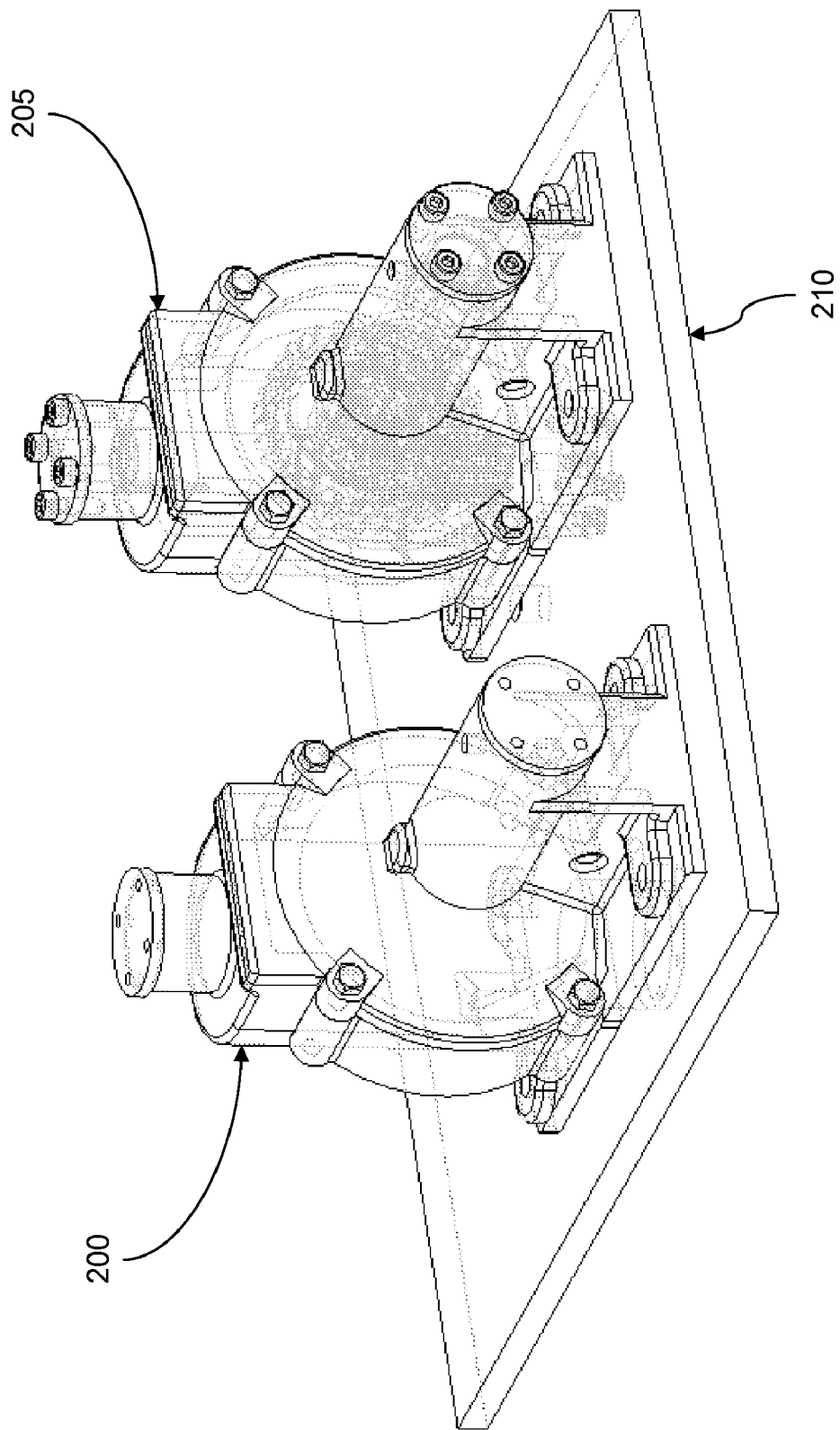
FIG. 2 is an isometric representation of two gear reducer assemblies.

The present application describes an innovative simplified assembly representation solution practiced on a 3D CAD software application, such as SolidEdge® by UGS Corp., that enables a user, also referred to as a designer, to create a simplified representation from a design representation of a 3D assembly model. For example referring to FIG. 2, an isometric representation of two gear reducer assemblies, a first gear reducer assembly 200 is in the simplified representation and a second gear reducer assembly 205 is in design representation where in practice the design representations of both gear reducer assemblies are placed in a higher level assembly and positioned relative to a mounting plate 210. That is, faces of the two gear reducer assemblies (200,205) are used to constrain and position in the higher level assembly that includes the mounting plate 210. Or put another way, the bottom faces of the gear reducer assemblies (200,205) are constrained to the mounting plate, and a plurality of bolt holes (not depicted) are axial aligned to position the two gear reducer assemblies (200, 205) onto the mounting plate 210. The user changes the first gear reducer assembly 200 from design representation to simplified representation, while keeping the second gear reducer assembly 205 in design representation view.

Figure 3:
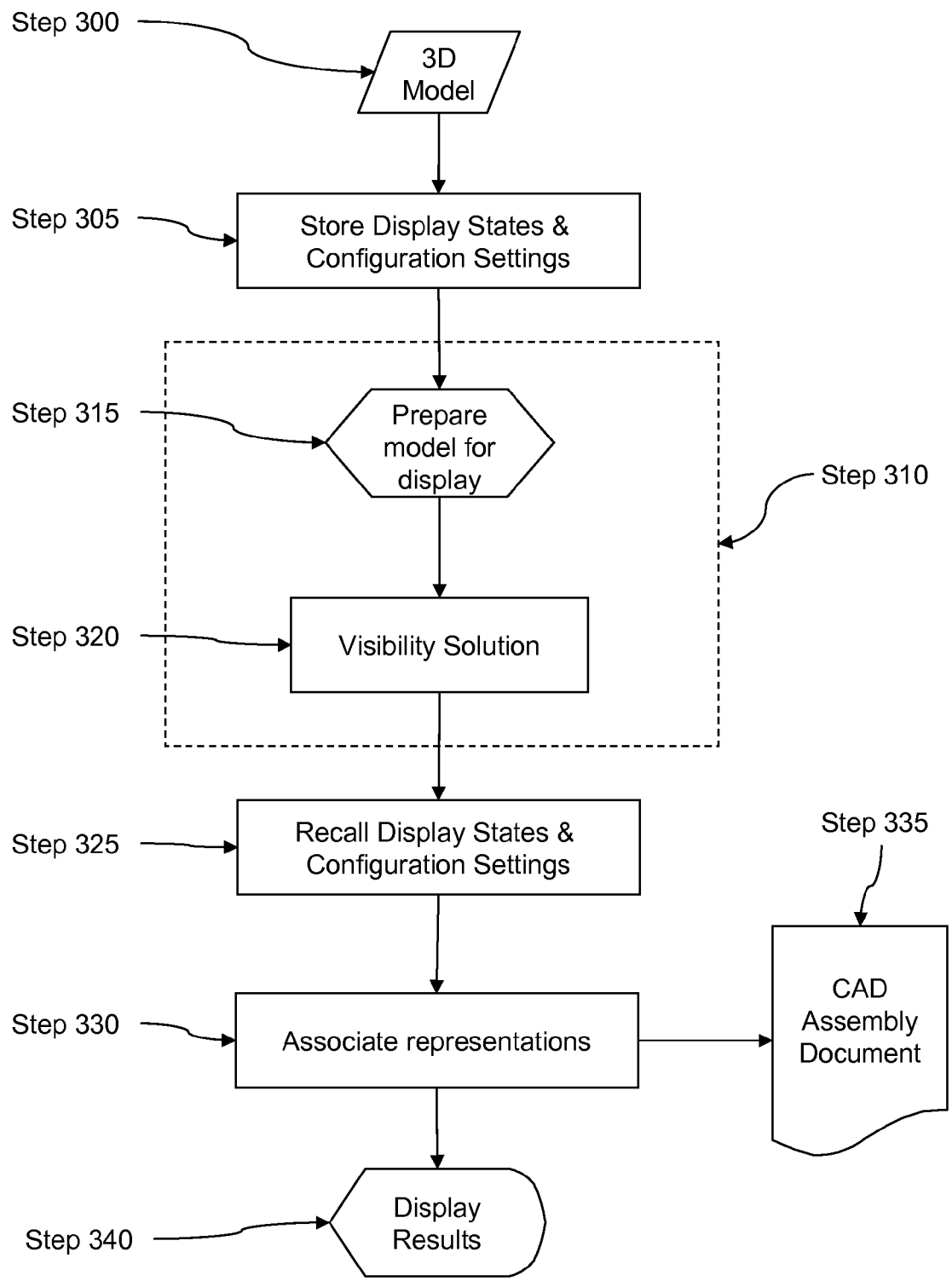
FIG. 3 is an illustration of a detailed logic flow diagram of the visibility solution algorithm in the presently preferred embodiment.

Turning to FIG. 3, a logic flow diagram of the presently preferred embodiment, the 3D assembly model can be created natively on the 3D CAD software application, or the 3D assembly model can be designed and/or constructed by other methods commonly known in the art of 3D assembly design. (Step 300) Next, display states and configuration settings of the design representation are stored (Step 305) for recall following a simplified representation mode. Following the simplified representation mode (Step 310), the previously stored display states and configuration settings are returned for application. (Step 325) The simplified representation is associated with the design representation by known means in the 3D CAD industry. (Step 330) By associating the simplified representation with the design representation, the presently preferred embodiment maintains an integrity that at a minimum maintains design intent and at a maximum rigidly constrains the model. Both representations are stored in a CAD assembly document (Step 335), and the software application displays results for further application. (Step 340)

Next, upon beginning the simplified representation mode, the 3D assembly model is prepared for display (Step 315) prior to beginning a visibility solution (Step 320) and if the 3D assembly model contains simplified geometry from a prior simplified representation operation, then the simplified geometry is displayed along with the other components of the 3D assembly model that have not been simplified. Simplified geometry is a generic term to identify any part/component that has been simplified pursuant to the methods and teachings disclosed herein. Likewise, components not shown in the design representation view do not participate during the simplified representation mode in the creation of the simplified representation.

Further to preparing the 3D assembly model for display (Step 315), the display color of the 3D assembly model is adjusted such that it is uniform throughout and initially characterizes all faces to be simplified as interior. In the simplified representation mode, the user can utilize the 3D software application to show/hide parts, activate/inactivate parts, show parts as simplified/designed, apply configurations, or change part styles using understood techniques. It is understood that the term "parts" refers to any structural element of the 3D assembly model, e.g., the face of a hex bolt is a "part" or the entire hex bolt could be a "part" as identified by the user.

Next the user identifies which parts and/or components on the 3D assembly model the presently preferred embodiment will ignore in the creation of the simplified representation by using a graphic slider to ignore small parts based on a slider value, and if desirable can manually select parts to ignore. The slider value can be adjusted to exclude a hole with a size of 0.05% of the area containing the surface, for example. It is understood that the percentage size could easily be more or less than 0.05%, depending on the design intent of the user, and that 0.05% is an arbitrary value shown for demonstrative purposes only. Parts and components the user identifies as "ignored" are not copied into the resulting simplified assembly representation, and those same ignored parts and components do not participate in a visibility solution to distinguish exterior faces from interior faces. Likewise, "small" can be hard-coded into the application disclosed such that the user cannot modify the definition of small as compared to the surface area of the assembly and/or component.

Further to the teachings discussed, the user is able to manipulate a quality of analysis by selecting to render each surface of the 3D assembly model as a finely tessellated depiction of a geometric representation of each surface. The granularity of tessellation can vary from fine to coarse, where coarse tessellation forms larger polygons such as triangles, squares or hexagons, while fine tessellation forms smaller polygons. Tessellating and re-tessellating the 3D assembly model improves the quality of the analysis by ignoring interior faces that would otherwise be considered visible.

Figure 4:
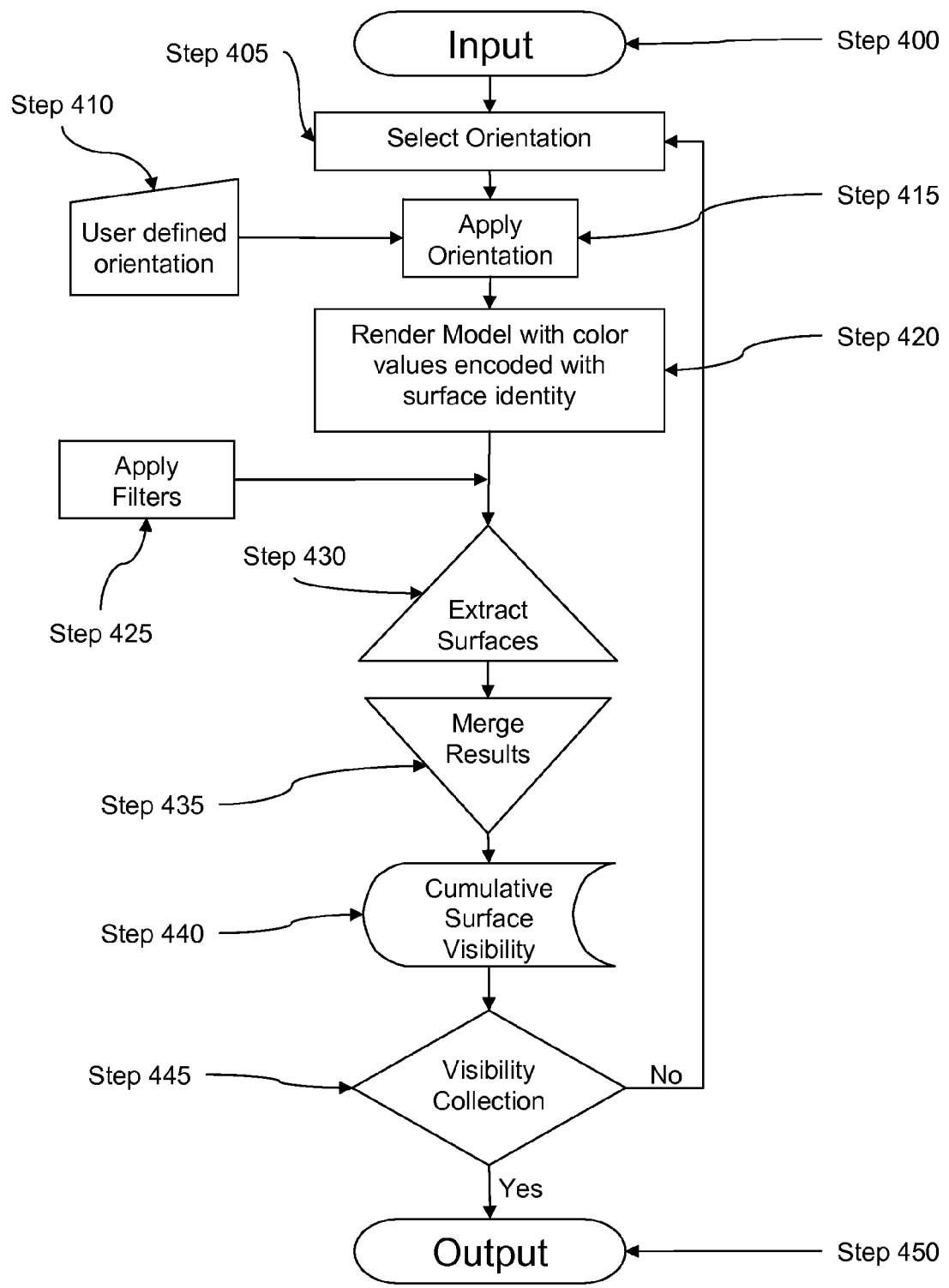
FIG. 4 is a 3D assembly model in an axonometric orientation.

Next, FIG. 4 is a logic flow diagram of a visibility solution as disclosed in greater detail. The visibility solution accepts as input the prepared 3D assembly model (Step 400). The disclosed preferred embodiment defaults to providing 24 orientations involved in refining the simplified representation mode where those orientations are orthogonal and/or axonometric. (Step 405) The user can also define additional orientations by freely rotating the prepared 3D assembly model or using other means known in the 3D CAD industry and commonly known by users of 3D design applications. (Step 410) The only limit to the number of desired orientations is the amount of time needed to process the orientations and accumulate the results of the visibility solution.

Next the visibility solution applies the selected orientation. (Step 415) The user can use further known techniques to manipulate the prepared 3D assembly model to improve the quality of the rendering, for example, optimizing zoom scale to increase model coverage, optimize depth buffer attributes, and adjust orientation to decrease the amount of viewed surface area. The user can further adjust the quality of analysis by modifying the dimensions for the rendering process to affect the accuracy of the rendering. For example, a width and height of the 3D assembly model can be increased to improve accuracy, or the width and height can be reduced to improve speed of the visibility solution but reduce the accuracy of the rendering.

Next, the resulting rendered image of the 3D assembly model displays information that is used to determine the identity of each visible surface of each occurrence of each component in the 3D assembly model, where the displayed information is identified as one color for exterior processed surfaces and another color for interior surfaces. (Step 420) The presently preferred embodiment employs the depth buffering feature of OpenGL to assign unique colors to differentiate the exterior surfaces from the interior surfaces. OpenGL is an open source graphics library that defines a cross-language cross-platform API for writing applications that produce 3D and 2D computer graphics. Depth buffering is a technique to determine which primitives in a model are occluded by other primitives such that as each pixel in a primitive is rasterized, its distance from the eye-point (depth value) is compared with the values stored in the depth buffer. Accordingly, if the pixel's depth value is less than the stored value, the pixel's depth value is written to the depth buffer, and its color is written to the color buffer.

Put another way, the depth buffering works by associating a depth, or distance, from the view plane with each pixel on the window so that the distance from the view pane is computed. With depth buffering enabled, before each pixel is drawn, a comparison is done with the depth value already stored at the pixel. If the new pixel is closer than what's there, the new pixel's color and depth values replace those that are currently written into the pixel. If the new pixel's depth is greater than what's currently there, the new pixel is obscured, and the color and depth information for the incoming pixel is discarded. In an alternative embodiment, the depth buffering could occur via hardware instead of the CAD software as disclosed. It is understood that any comparable graphics library may be used, provided a feature similar to depth buffering is available. Likewise, a separate graphics library does not have to be used, but instead can be integral into the CAD software. Following the depth buffering, the final rendered image contains colored pixels that can be decoded and mapped back from the surface rendered to that location in the 3D assembly model, as orientated, with color values encoded with each surface as identified. This results in the software application providing graphical feedback to the user by changing all processed faces identified as exterior of the various components to a solid color The quality of the rendering is further scrutinized and controlled by applying a plurality of filtering algorithms to the resulting image that removes rendering artifacts common with various rendering techniques. (Step 425) One such rendering artifact is called a speckle. The visibility solution can ignore these speckle anomalies by applying a common speckle removal tool, e.g., a speckle removal filter. The speckle removal filter prevents speckles from affecting surrounding areas in the rendered image, which decreases the number of surfaces that comprise the final rendered image.

Following the application of filters to remove the rendering artifacts (Step 425), the visibility solution extracts the rasterized surfaces (Step 430) and merges the resulting surfaces (Step 435) with a plurality of visibility solutions. (Step 440) If the user requires multiple orientations to distinguish the external surfaces from the internal surfaces, then the visibility solution is not complete (Step 445) and the visibility solution returns to selecting the next orientation. (Step 405)

In creating the final simplified representation of the detailed design, the user has the ability to identify insignificant components by rotating, zooming in/out, etc., to inspect what the visibility solution algorithm identified as interior/exterior and re-run the algorithm to select additional exterior faces from that specific orientation. One of the benefits of the presently preferred embodiment is the components chosen to be excluded from the final simplified representation, like the small bolts, still participate in the visibility solution.

Upon completion of the model-simplified mode the simplified representation of the assembly is created where ignored parts will not have faces copied, interior parts/faces will not be copied, view orientations specified by the user to add more exterior faces are remembered for later reuse, exterior faces are copied into the assembly associatively and with their corresponding original part face style, and only the simplified geometry will be displayed with all components hidden. Upon return, the 3D assembly model reverts to the design representation and obscures the simplified geometry; after which the display state and configuration settings previously stored are reapplied. (Step 450)

Figure 5:
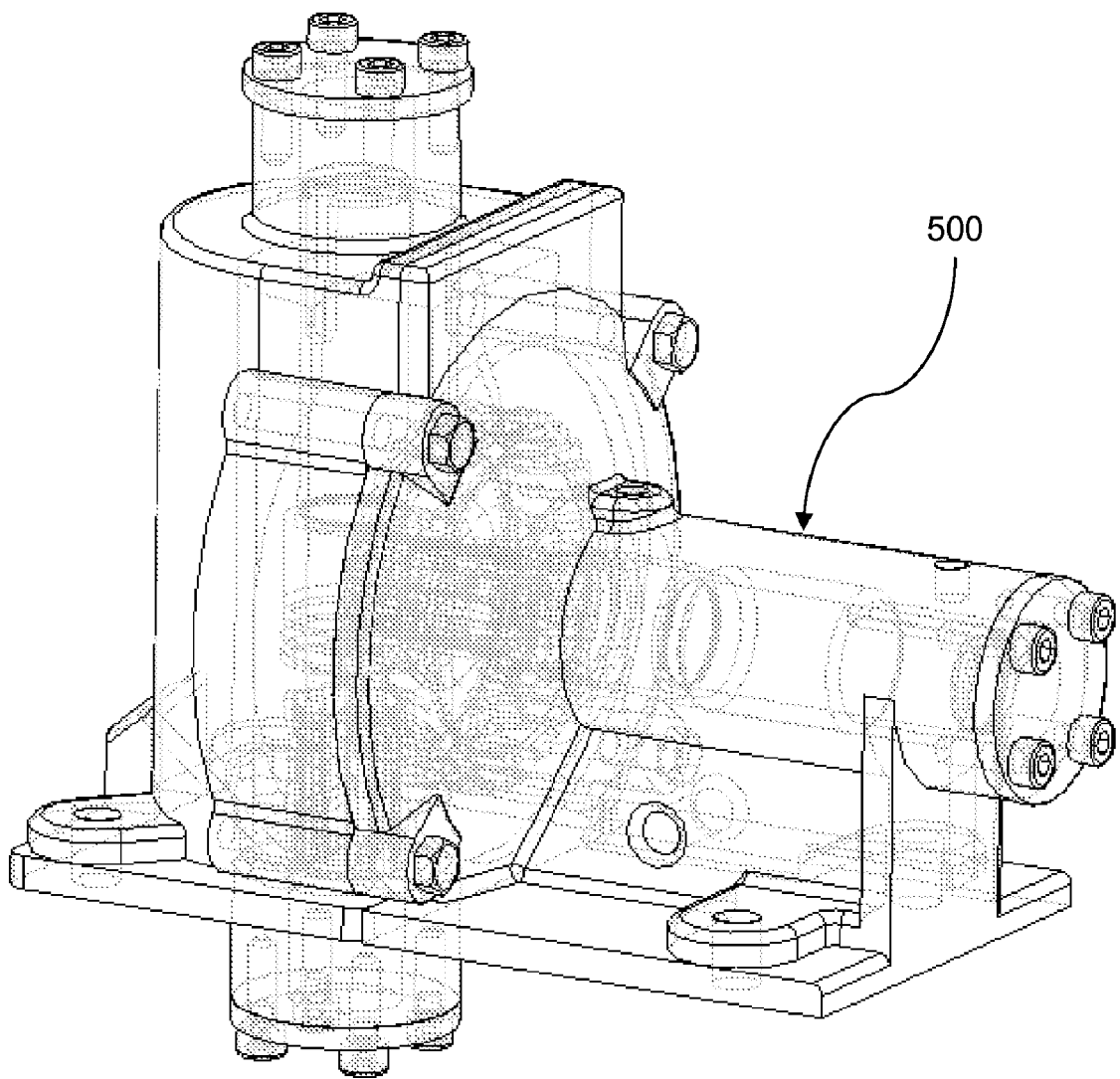
FIG. 5 is an axonometric orientation of a gear reducer assembly in design representation.
Figure 6:
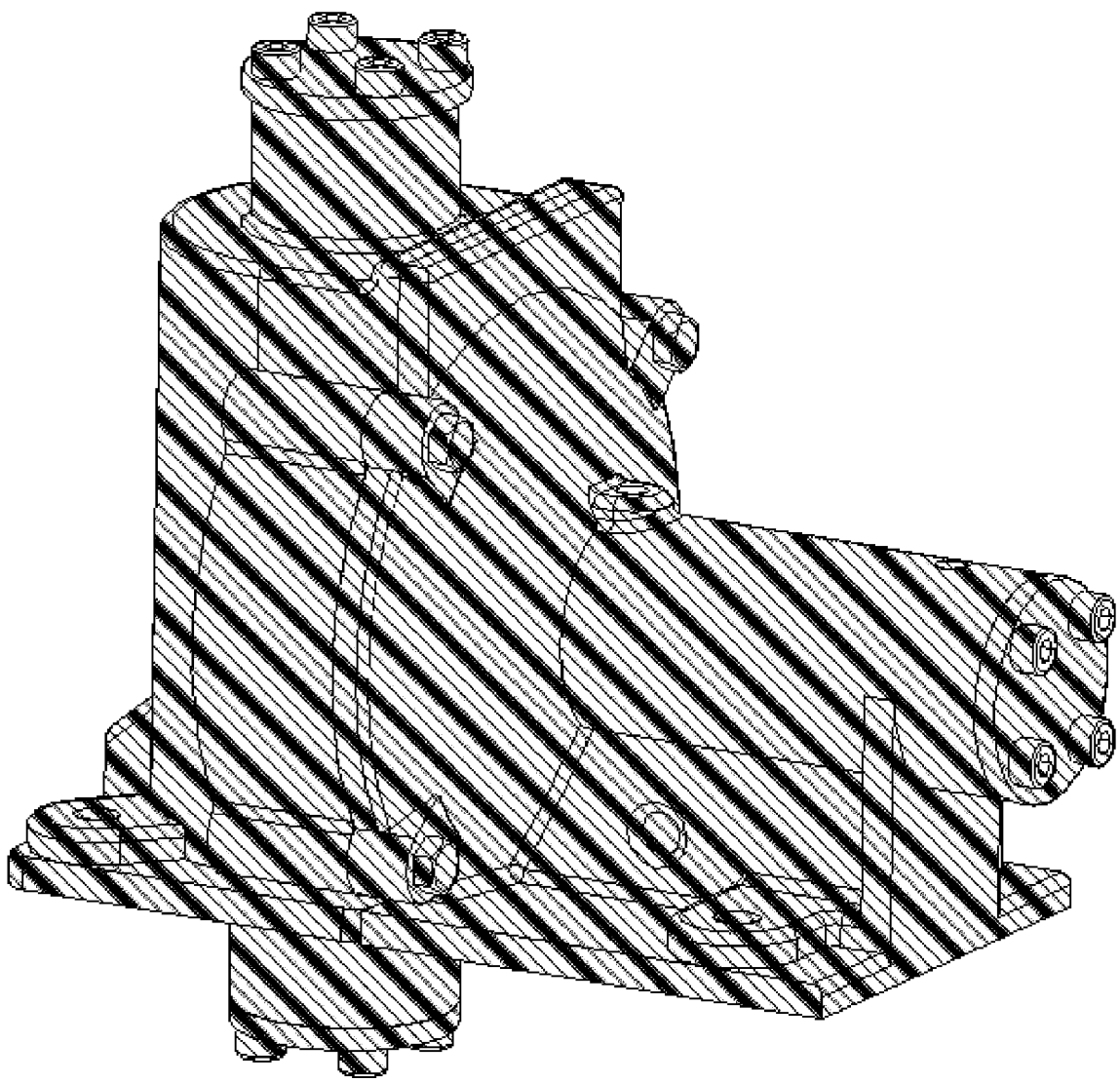
FIG. 6 is an illustration of an orthogonal plane view of a shaft extended through a hole.
Figure 7:
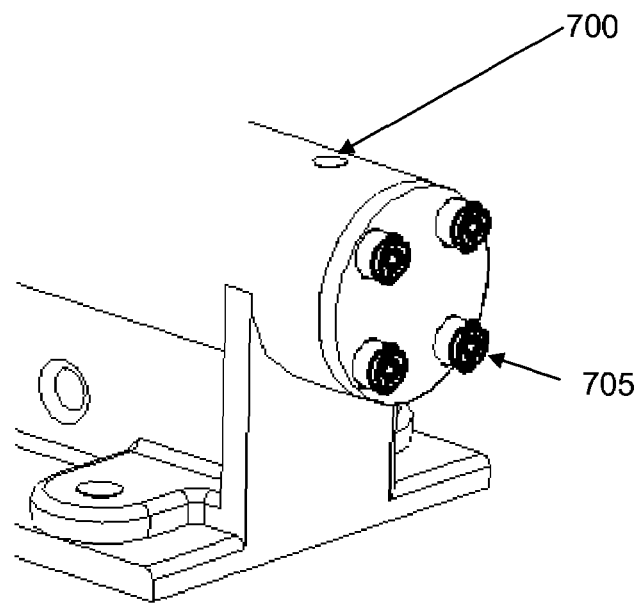
FIG. 7 is a partial view of a gear box assembly having a hole.

By way of example and not limitation, the user starts with FIG. 5, an axonometric orientation of a gear reducer assembly in design representation, and determines to create a simplified representation of a gear reducer assembly 500 by initiating the presently preferred embodiment which causes the gear reducer assembly to become one solid color with each part initially identified as interior as illustrated in FIG. 6, an illustration of an orthogonal plane view of a shaft extended through a hole. Prior to initiating the visibility solution, the user determines to ignore a small hole 700 and a plurality of small bolts 705 as illustrated in FIG. 7, a partial view of the gear reducer assembly, that will not be included in the complete simplified representation. The presently preferred embodiment allows the user the ability to determine when to begin the visibility solution by displaying a process button. While processing, the presently preferred embodiment also provides the user the ability to cancel and review or modify the visibility solution when appropriate.

Figure 8:
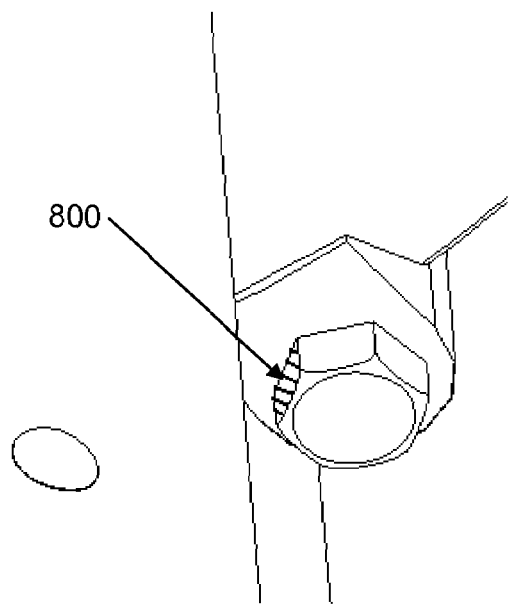
FIG. 8 is a close-up view of a bolt.
Figure 9:
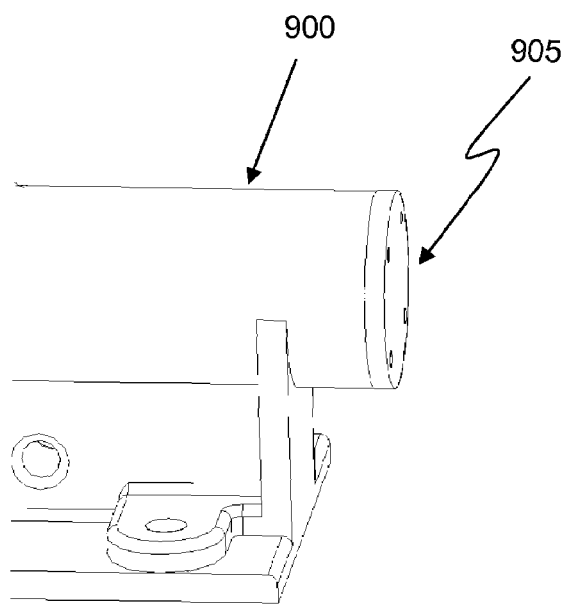
FIG. 9 is an axonometric orientation of the gear reducer assembly in simplified representation.

FIG. 8 is a close-up view of a bolt and shows the exterior faces as white, and the interior faces in magenta, but illustrated in with a diagonal-line. Following the rendering (Step 420) the user views a gear reducer assembly, while the visibility solution resolved the exterior faces, it calculated a bolt face 800 as being interior, when in fact the bolt face 800 is exterior to the gear reducer assembly 500. Utilizing the 3D software application, the user then selects the bolt face 800 as a member of the exterior faces that comprise the gear reducer assembly 500 by use of a mouse click or other known selection ability. FIG. 9 illustrates an axonometric orientation of the gear reducer assembly in simplified representation, the user excluded the small hole 700 and the small bolts 705 that are not present as seen at 900 and 905, respectively.

Figure 10:
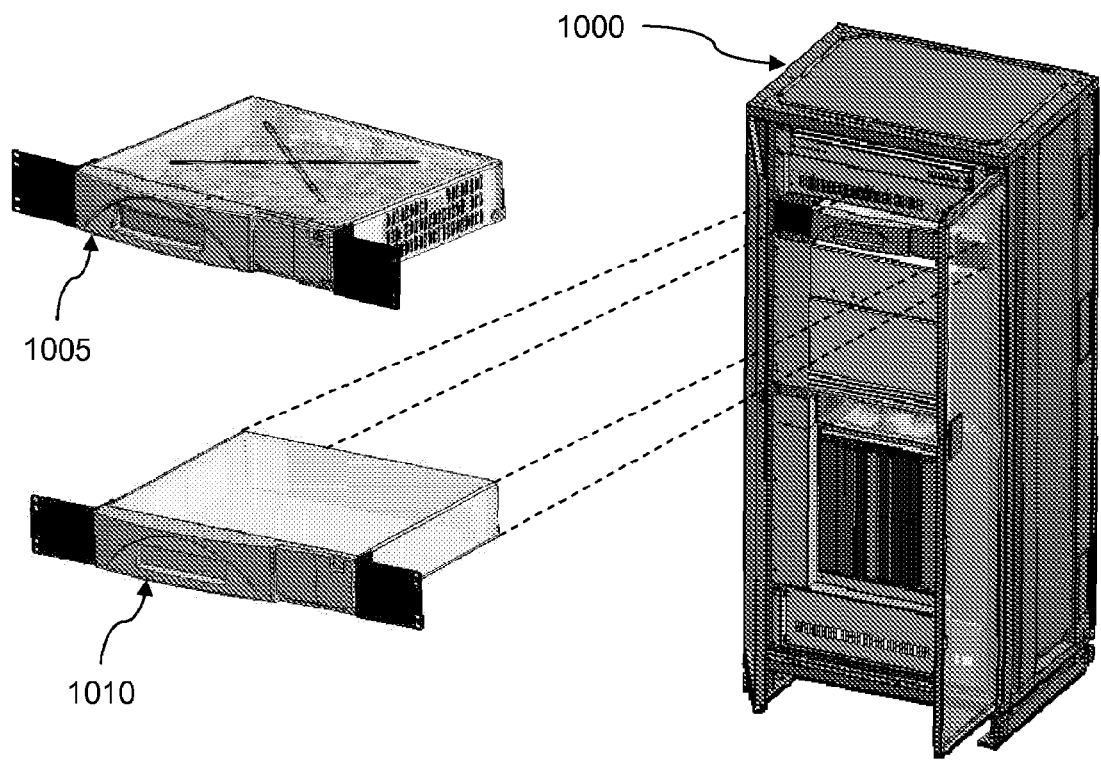
FIG. 10 is a design representation of a CPU rack assembly and a network communication machine.
Figure 11:
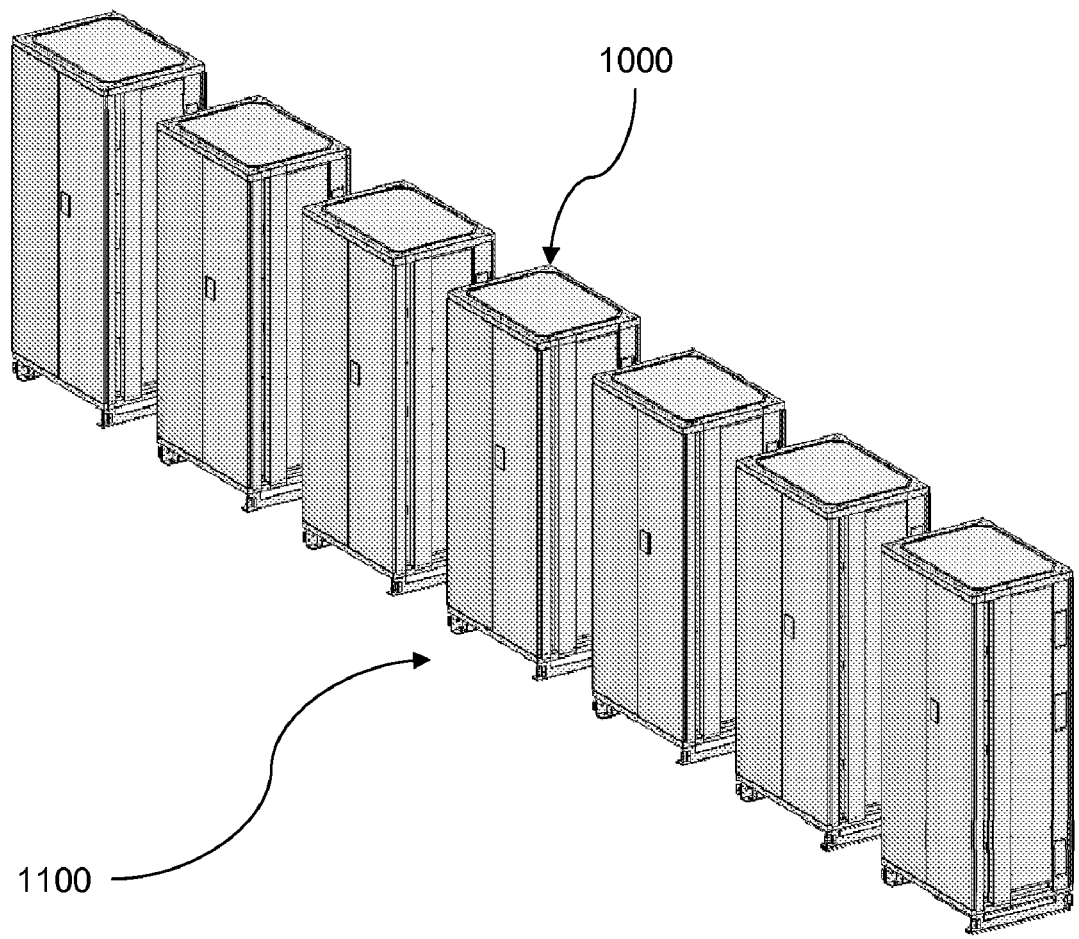
FIG. 11 is a portion of a computer room with multiple network communication machines.

With the aforementioned disclosed teachings in mind, FIG. 10, a design representation of a CPU rack assembly and a network communication machine, and FIG. 11, a portion of a computer room with multiple network communication machines, the user utilizes the presently preferred embodiment to place a CPU rack assembly into a top-level assembly like a network communications system 1000. A design representation of the CPU rack assembly 1005 is constrained within the network communications system 1000 via methods commonly understood in the art. Likewise the CPU rack assembly can be shown with simplified parts, illustrated at 1010, and is then available for use. The network communications system 1000 can then be multiplied and placed in a higher-level assembly like in a computer room, generally shown at 1100. The simplified representation can occur in each sub-assembly, like the Simplified CPU rack assembly 1010, and as well as the top-level assembly, like the network communications system 1000. All of the foregoing simplifications benefit the higher-level assembly computer room 1100 in the manners previously discussed.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, for example the Direct3D library by Microsoft® could be used instead of the OpenGL library. Likewise, following rendering, should poor silhouette edges occur, then those edges can be further refined using various filtering schemes known in the art. Therefore, other implementations are within the scope of the following claims.

We claim:

1. A method to determine a simplified representation of an assembly model comprising the steps of:
    saving a plurality of display states and configuration settings of an assembly model in a design representation in a computer system memory;
    translating said design representation, by a computer system, into a simplified representation by use of a visibility solution, including rendering a model having a plurality of parts with at least one color value encoded for an at least one corresponding surface identity, distinguishing a plurality of exterior parts from a plurality of interior parts based on said at least one corresponding surface identity, and identifying a plurality of features in said model not copied into a composite image; and
    storing said simplified representation and said design representation in an assembly document by the computer system.

2. The method of claim 1, wherein the integrity of the association of at least said simplified representation and said design representation is maintained.

3. The method of claim 1, further comprising the step of displaying said plurality of parts from at least one orientation.

4. The method of claim 1, further comprising the step of displaying said composite image comprised of said exterior parts and lacking said plurality of features.

5. The method of claim 1, further comprising the step of preparing said model to improve accuracy of a rendering operation.

6. The method of claim 1, further comprising the step of implementing at least one filtering algorithm to adjust a quality of analysis of said rendering.

7. The method of claim 1, further comprising the step of preparing said model to adjust accuracy of a rendering operation wherein said accuracy is adjusted by tessellating said model.

8. The method of claim 1, wherein said step of rendering operates to depict said model as a tessellated version of a geometrical representation of a plurality of surfaces.

9. The method of claim 1, wherein said simplified representation of an assembly model is embodied on a computer-readable medium on a computer in conjunction with an application, the simplified representation comprising:
    a reduced form of an assembly model derived from a designed form of said assembly model, having a plurality of exterior faces, wherein:
    said exterior faces consist of a plurality of components from said design form; and
    said reduced form is associatively coupled with said designed form, accessible from a common assembly document.

10. A computer readable medium storing computer-executable instructions that when executed cause a computer to perform a method to determine a simplified representation of an assembly model, comprising:
    instructions for saving a plurality of display states and configuration settings of an assembly model in a design representation;
    instructions for translating said design representation into a simplified representation by use of a visibility solution, including rendering a model having a plurality of parts with at least one color value encoded for an at least one corresponding surface identity, distinguishing a plurality of exterior parts from a plurality of interior parts based on said at least one corresponding surface identity, and identifying a plurality of features in said model not copied into a composite image; and
    instructions for storing said simplified representation and said design representation in an assembly document.

11. The computer readable medium of claim 10, wherein the integrity of the association of at least said simplified representation and said design representation is maintained.

12. The computer readable medium of claim 10, further comprising the instructions for displaying said plurality of parts from at least one orientation.

13. The computer readable medium of claim 10, further comprising the instructions for displaying said composite image comprised of said exterior parts and lacking said plurality of features.

14. The computer readable medium of claim 10, further comprising the instructions for preparing said model to improve accuracy of a rendering operation.

15. The computer readable medium of claim 10, further comprising the instructions for implementing at least one filtering algorithm to adjust a quality of analysis of said rendering.

16. The computer readable medium of claim 10, further comprising the instructions for preparing said model to adjust accuracy of a rendering operation wherein said accuracy is adjusted by tessellating said model.

17. The computer readable medium of claim 10, wherein said instructions for rendering operates to depict said model as a tessellated version of a geometrical representation of a plurality of surfaces.

18. A data processing system comprising a processor and accessible memory, configured to implement a method to determine a simplified representation of an assembly model by performing the steps of:
  rendering a model having a plurality of parts with at least one color value encoded for an at least one corresponding surface identity;
  distinguishing a plurality of exterior parts from a plurality of interior parts based on said at least one corresponding surface identity; and
  identifying a plurality of features in said model not copied into a composite image.

* * * * *

UNITED STATES PATENT AND TRADEMARK OFFICE
CERTIFICATE OF CORRECTION

PATENT NO. : 7,646,384 B2  Page 1 of 1
APPLICATION NO. : 11/278110
DATED : January 12, 2010
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this

Sixteenth Day of November, 2010

David J. Kappos
*Director of the United States Patent and Trademark Office*